United States Patent [19]
Williams

[11] Patent Number: 5,240,565
[45] Date of Patent: Aug. 31, 1993

[54] APPARATUS FOR CONVERTING PAPER MILL WASTE SLUDGE INTO CHARCOAL

[76] Inventor: Robert M. Williams, 16 La Hacienda, Ladue, Mo. 63124

[21] Appl. No.: 983,408

[22] Filed: Nov. 30, 1992

[51] Int. Cl.⁵ .................... C10B 1/04; C10B 57/10
[52] U.S. Cl. .................................. 202/99; 201/8; 201/21; 201/29; 201/34; 202/121; 202/262
[58] Field of Search ................... 202/99, 121, 262; 201/2.5, 7, 8, 21, 29, 34; 241/48, 58

[56] References Cited

U.S. PATENT DOCUMENTS

| | | | |
|---|---|---|---|
| 1,805,109 | 5/1931 | Runge et al. | 201/8 |
| 3,094,467 | 6/1963 | Kruppa | 201/21 |
| 3,414,480 | 12/1986 | Stotler et al. | 201/8 |

FOREIGN PATENT DOCUMENTS 36873  10/1974  Japan ........................ 201/21

Primary Examiner—Joye L. Woodard
Attorney, Agent, or Firm—Polster, Lieder, Woodruff & Lucchesi

[57] ABSTRACT

Apparatus for the production of charcoal by the comingling of a source of wood and ground sludge where the sludge is received from a paper making plant as wet sludge, grinding the wet sludge to a desired reduction, feeding the ground sludge into a furnace where it is comingled with wood, and circulating the furnace hot gas exhaust back through the grinding of the wet sludge to initiate the drying thereof.

3 Claims, 1 Drawing Sheet

APPARATUS FOR CONVERTING PAPER MILL WASTE SLUDGE INTO CHARCOAL

BACKGROUND OF THE INVENTION

1. Field of the Invention

This invention is directed to a method of producing a charcoal product from a combination of wood and the deinked sludge waste from the manufacture of reconstituted paper.

2. Description of the Prior Art

It is well known that the making of charcoal consists in the destructive distillation of wood to drive off the volatile hydrocarbons, pyroligneous acid, and tar. It is also well known that the making of paper begins with pulp for its cellulose content. The cellulose fibers from wood are used mainly in two forms; one is ground wood or mechanical pulp without purification which goes into newsprint, cheap manila paper and nonpermanent tissue, the other is chemical pulp such as soda process pulp, obtained from digestion of wood chips, or sulfite process pulp obtained by digestion with a solution of calcium disulfite containing free sulfur dioxide, or sulfate process pulp in which sodium sulfate is added to the caustic liquors but is reduced by the carbon present to the sulfide which becomes a digesting agent. Whichever paper making process is employed, the pulp needs to be treated to remove the printing ink, and that results in the formation of a deinking sludge which is considered as a throw-a-way material that is regarded as a pollutant.

Since the making of charcoal uses a wood material, and the sludge discharge in the paper making industry comes from a wood fiber, it has been found that the deinking sludge when properly dewatered can be used in the making of charcoal, thereby using up the sludge, rather than collecting it for disposal as a throw-a-way environmental pollutant.

BRIEF SUMMARY OF THE INVENTION

The invention is directed to the conversion of the sludge waste produced in the paper making operation as an ingredient in the making of charcoal so that the sludge is not left to pollute the environment.

It is an important object of the invention to provide apparatus for producing charcoal by the combination of wood and sludge waste in a charcoal forming furnace with the use of the hot distillate gases to dry the incoming sludge waste to a condition that results in the production of a charcoal product.

It is a further object of the invention to process the sludge waste, which is a throw away material produced during the paper making activity, by grinding the sludge to prepare it for conversion into charcoal concurrently with a supply of wood, and to apply the heat produced during the charcoal making step for reducing the sludge moisture content during the grinding of the sludge.

A further object of the invention is to process the sludge waste from a paper making activity in a drying step so that the heating value in the dried ground sludge can be made available as a useful adjunct in the making of asphalt or cement.

Another object of the invention resides in the method of applying the hot gaseous discharge developed in a charcoal making furnace for drying the wet sludge waste produced in paper making activity so that the dried sludge becomes a fuel source when it has a BTU value of significates for use in other applications.

BRIEF DESCRIPTION OF THE DRAWINGS

The invention can be practiced by the use of apparatus disclosed in the following drawings, wherein.

DETAIL DESCRIPTION OF THE EMBODIMENT

Figure 1:
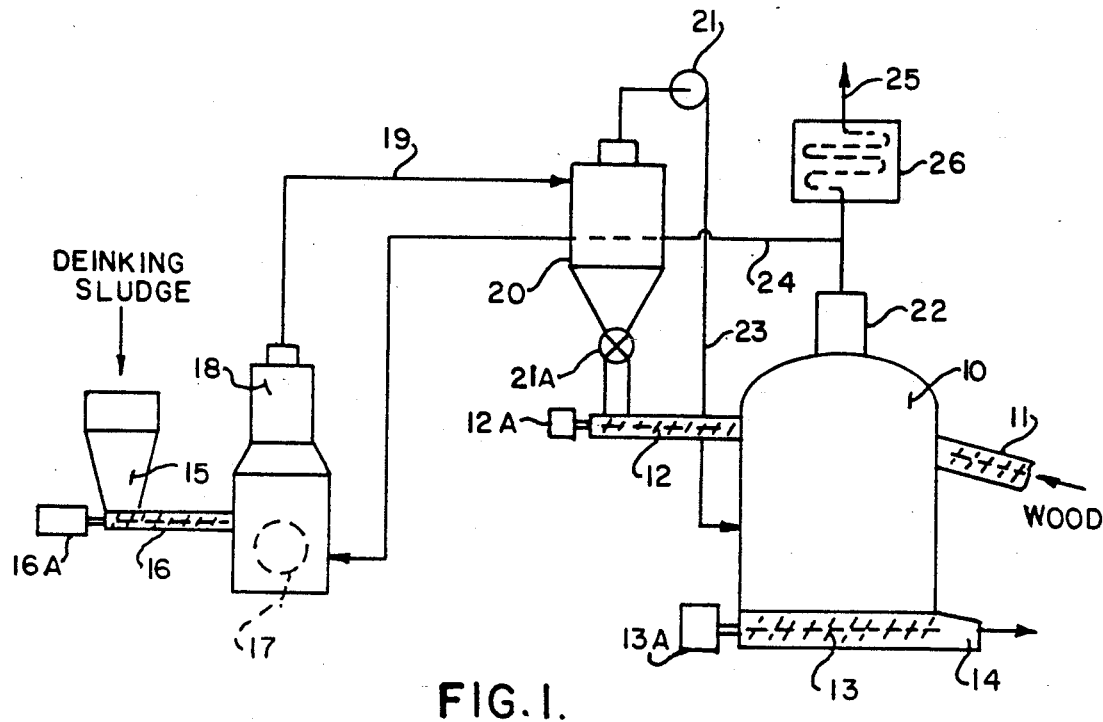
FIG. 1 is a schematic diagram which illustrates an organization of apparatus components suitable for carrying out the best mode of the invention.

The invention referred to above is practiced in the apparatus which is schematically shown in FIG. 1 as the best mode for carrying out the operation whereby the production of a charcoal product is the result of converting a wood source and a dried sludge in a furnace. Thus, the furnace 10 is supplied with a source of suitable wood by conveyor 11, and a source of dried sludge supplied by a conveyor 12. The charcoal product is collected and moved by a suitable conveyor 13 to an outlet 14 at the bottom of or a low zone of the furnace 10.

The source of the dried sludge delivered by conveyor 12 is a waste material which can be obtained from the paper mill operation that disposes of deinking sludge that is a cost item for the paper mill operator. The sludge has a BTU heat value which, after being suject to a drying step, can be converted into charcoal, thereby converting the sludge from a material that heretofore has been disposed of in landfills into a useful source of material for charcoal production. The sludge is delivered to a collecting bin 15 where it is moved by a screw conveyor 16 driven by motor 16A into a grinding mill 17 for reduction by grinding and sizing in a separator 18. From the separator 18 the properly ground sludge is moved by conduit 19 into a cyclone separator 20 by the negative pressure in the system 17, 18, 19 and 24 by the suction effect of a fan 21 which draws off the gaseous exhaust medium from the conversion of solids in the furnace 10 by way of conduit 24 and directs that gaseous medium by conduit 23 into the furnace 10 to produce drying heat that is flowing in conduit 24 back to the mill 17. Solids collected in the cyclone 20 are discharged into the conveyor 12 driven by motor 12A from a rotary valve 21A for delivery to the furnace 10.

The step of drying the sludge received from a paper mill is carried out by using the hot gaseous medium discharged from the furnace at the chimney 22. Some of the hot gaseous medium enters conduit 24 by the negative pressure in the system which draws the hot gaseous medium into conduit 24 for delivery into the mill 17 where the drying is initiated. After being subjected to the drying step, the gaseous medium produced by the action of the cyclone 20 is returned by the fan 21 back to the furnace by way of conduit 23. The production of charcoal in furnace 10 is carried out with as little air as possible, and the system achieves that requirement as very little air enters the system during operation of the conveyors 16 and 12.

It can be appreciated from FIG. 1 that once the apparatus is functioning in an acceptable way, the charcoal product is delivered by the conveyor 13 driven by motor 13A, and the spent gaseous medium is sanitized and then released to the atmosphere at stack 25 after being cooled down at unit 26.

In some instances where the BTU content in the paper mill sludge deposited in the feed bin 15, is in excess of the need to be converted with wood into charcoal by the furnace 10, the dried material separated out by the cyclone 20A (See FIG. 2) can be divided from the outlet 27 from the cyclone 20A and the excess directed into bin 30 where it can eventually be dispensed by screw conveyor 31 and sold as a fuel.

Figure 2:
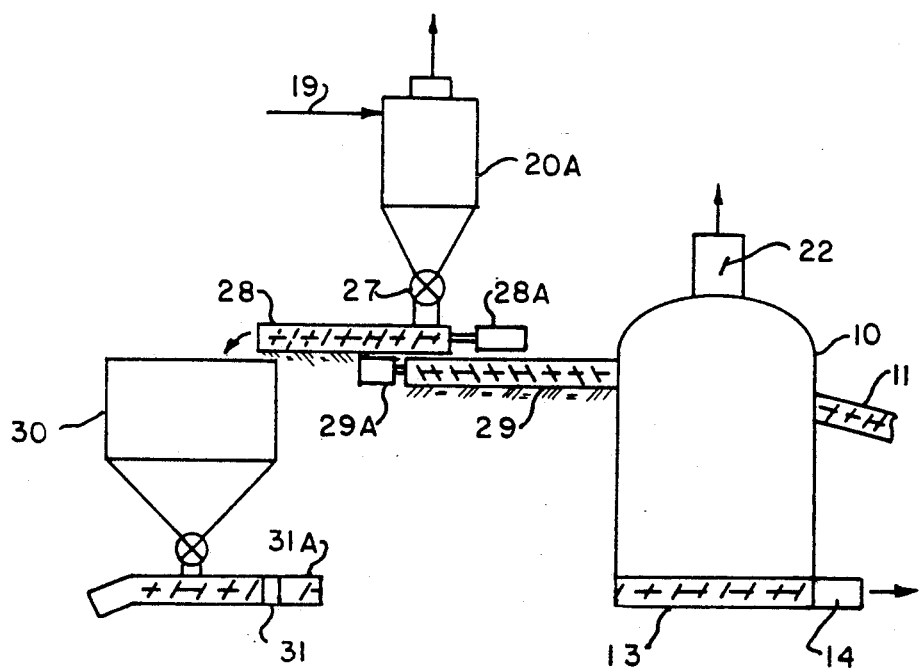
FIG. 2 is a schematic diagram of cooperating components which together expands the scope of the invention.

The system of FIG. 2 is a modification of the system of FIG. 1 to the extent that a cyclone 20A is provided with a rotary valve 27 which releases the solids into the upper drive end of a suitable screw conveyor 28 driven by motor 28A. The drive end of conveyor 28 is open to a lower screw conveyor 29 driven by motor 29A so the material discharge at rotary valve 27 passes through the housing of the upper conveyor, and is moved by the lower conveyor 29 into the furnace 10 to mix with wood delivered by conveyor 11 to the furnace 10, as before. The rate of drive of conveyor 29 can be such that the dried material may back up and cause the operation of the upper conveyor motor 28A to scalp-off the material and move it through conveyor 28 to the bin 30 where it is collected where the motor 31A drives discharge conveyor 31. That material collected in bin 30 can be employed as an adjunct in the making of asphalt or some forms of cement. The major quantity of the material is moved into the furnace 10 by the operation of the screw conveyor 29 driven by motor 29A. The product from furnace 10 is, as noted before, moved by a conveyor 13 to the discharge 14.

It is observed in FIG. 1 that the apparatus components which comprise the grinding mill 17, the cyclone separator 20 and its blower 21, and the furnace 10 are connected up in a system in which the grinding mill is connected by conduit 19 to the cyclone separator 20 to have its ground output moved into the cyclone by the blower 21 and the output from the blower 21 is directed into the furnace 10. The furnace 10 has a chimney or an outlet 22 for the hot gases, and those gases are divided so that a sufficient volume is directed into the grinding mill 17 to initiate the drying of the waste sludge admitted to the grinding mill 17 from a bin 15. The remainder of the hot gases from the chimney 22 are directed into the heat dissipator 26 before being released at 25 to atmosphere. The particulates separated out of the material from the grinding mill 17 at the cyclone separator 20 are moved by the screw conveyor 12 into the furnace 10 to augment the supply of wood material from the conveyor 11. The system of FIG. 1 or FIG. 2 provides the furnace 10 with a minimum access to oxygen which enters with the wet sludge at the grinding mill, only to be diluted and partly dried by the circulation of the hot gases from the furnace.

The commercial advantage of the system and apparatus set forth is that the normal waste material produced by the paper making industry can be converted into a useful product rather than allowing it to be disposed of in a landfill.

What is claimed is:

1. In apparatus for the production of charcoal from a mixture of wood and waste sludge from a paper mill, the apparatus comprising:
    a) a furnace having an inlet for the reception of wood; a chimney for the release of hot gases from the furnace, and an outlet for charcoal;
    b) a grinding mill having an inlet for the reception of the waste sludge and an outlet for ground sludge;
    c) a cyclone separator having an inlet, a gaseous outlet and an outlet for solids;
    d) a system of conduits inter-connecting said furnace, said cyclone separator, and said grinding mill in which hot gases from said furnace chimney are conducted to said grinding mill for initiating the drying of the waste sludge; the gases and ground waste sludge are conducted to said cyclone separator inlet for the separation of the gases from the ground waste sludge; and said system further including
    e) blower means having an inlet connected to said cyclone separator gaseous outlet for effecting the movement of the hot furnace gases through said grinding mill, and said blower having an outlet for returning the gases to said furnace;
    f) ground waste sludge conveying means connected between said cyclone separator and said furnace for depositing the ground waste sludge in said furnace; and
    g) conveying means connected to said furnace outlet for removing the charcoal generated in said furnace.

2. In apparatus for the production of charcoal from paper mill waste materials usually consigned to landfill disposal, the improvement comprising:
    a) rotary grinding mill having an inlet and an outlet for ground waste material;
    b) means to introduce to said grinding mill a sludge waste collected from a paper mill;
    c) a cyclone separator connected to said grinding mill outlet to collect the ground waste solids, said cyclone having an outlet for collected ground solid waste and an outlet for gaseous material;
    d) blower means connected to said cyclone separator gaseous material outlet to place said grinding mill and separator under a negative pressure condition;
    e) furnace means for producing a charcoal product;
    f) means to feed wood material to said furnace means;
    g) means to connect said cyclone solid waste outlet to said furnace to transfer the waste solids from said cyclone to said furnace to comingle with the wood material in the production of charcoal;
    h) hot gaseous material outlet leading from said furnace to allow for the escape of the hot gaseous material from said furnace;
    i) means to form a connection from said last named hot gaseous material outlet to said grinding mill to supply heat for initiating the drying of said sludge waste in said grinding mill, said last named means forming a connection from said furnace hot gaseous material outlet to said grinding mill to subject said connecting means to the negative pressure condition at said grinding mill; and
    j) means connecting said blower means to said furnace to supply the hot gaseous material back to said furnace for promoting the production of charcoal.

3. The improvement set forth in claim 2, wherein said means to connect said cyclone solid waste outlet to said furnace is provided with an alternate discharge for collection of ground sludge waste apart from said furnace.

* * * * *